Patented Dec. 5, 1950

2,532,559

UNITED STATES PATENT OFFICE 2,532,559

HYDROCARBOSILICON ISOCYANATES

David X. Klein, Andover, Mass., assignor to E. I. du Pont de Nemours & Company, Wilmington, Del., a corporation of Delaware No Drawing. Application October 3, 1946, Serial No. 701,059

14 Claims. (Cl. 117—123)

This invention relates to organic compounds of silicon. More particularly this invention relates to new organosilicon compounds having a carbon-silicon bond, to a method for their preparation and to articles coated with such new compounds.

The organosilicon chlorides, particularly those in which an organic radical is attached to silicon through a carbon-silicon bond, possess the interesting property of conferring water repellency to textiles, glass, ceramics and the like. However, in so doing, these chlorides undergo hydrolysis with the liberation of hydrochloric acid. Inasmuch as hydrochloric acid has a pronounced tendering action on cellulose and is capable of attacking many types of ceramics, the applicability of these organosilicon chlorides is quite limited. For example, they cannot be used for the treatment of cotton fabrics because of the severity of the hydrogen chloride tendering.

It is an object of this invention to provide a new class of organosilicon compounds and a method for their preparation. A further object is to provide a new class of organosilicon compounds, the hydrolysis of which does not liberate a cotton-tendering acid. A still further object is to provide new organosilicon compounds which have a direct union of carbon with silicon. Another object is to provide water repellent articles in which the water repellency is conferred by these new organosilicon compounds. Other objects will appear hereinafter.

These objects are accomplished by new organosilicon isocyanates having the general formula $R_nSi(NCO)_{4-n}$ wherein R is a monovalent hydrocarbon radical and $n$ is an integer having a value of 1, 2 or 3. These organosilicon isocyanates thus are hydrocarbosilicon isocyanates containing a monovalent hydrocarbon radical joined to the silicon by a carbon-silicon bond. The hydrocarbon radicals can be saturated or unsaturated radicals, such as alkyl, alkenyl, aryl, aralkyl and cycloalkyl. The alkylsilicon isocyanates are preferred for the purpose of imparting water repellency to textiles and ceramics. Particularly effective are the dialkylsilicon diisocyanates, for which $n$ in the above formula has the value 2.

The new organosilicon compounds of this invention can be made by reacting an inorganic salt of cyanic acid with an organosilicon halide having the formula $R_nSiX_{4-n}$ wherein R is a hydrocarbon radical, such as alkyl, alkenyl, aryl, aralkyl and cycloalkyl hydrocarbon radicals, X is halogen and $n$ is an integer having a value from 1 to 3 inclusive. These organosilicon halides are thus hydrocarbosilicon halides. In the preparation of these new organic isocyanates various halides of silicon can be employed, but the chlorides are most generally used since they are inexpensive and readily obtainable.

The preparation of these new organosilicon isocyanates can be carried out by reacting the corresponding organosilicon halides with an inorganic cyanate. For example, an alkylsilicon isocyanate is prepared by reacting an inorganic cyanate, such as lead cyanate, with an alkylsilicon halide, such as dimethylsilicon dichloride. Especially preferred are the heavy metal salts of cyanic acid, such as those of silver, lead, mercury, copper, or zinc.

The reaction can be carried out conveniently, for example, by treating the dialkylsilicon dichloride with an excess of lead cyanate in refluxing benzene followed by filtration of the lead salts and distillation of the reaction products. The reaction temperature can be varied between 25° and 200° C. depending on the particular hydrocarbosilicon halide and particular organic solvent employed, but is preferably maintained between 50° and 125° C. Many of the alkylsilicon isocyanates which are the subject of this invention can be isolated and purified by distillation. In other cases, high boiling solid compounds are formed and these can be isolated and purified by recrystallization from suitable inert non-hydroxylic solvents.

The reaction can be carried out without a diluent, particularly in those cases where the organosilicon halide is a liquid. In such cases the reaction can be carried out at temperatures ranging from 50° C. to 125° C. However, it is preferred to employ an inert diluent for this purpose. Particularly useful in this connection are hydrocarbon solvents, such as benzene, toluene, octane and the like. Other solvents which can be employed include ethers and ketones.

Articles treated or impregnated with the new organosilicon isocyanates of this invention are rendered water repellent. The articles can be treated with the organosilicon isocyanate from solution or by any other available method. After treatment with the organosilicon isocyanate, the article is dried and may be heat treated, preferably at a temperature of 125° to 175° C. for a short period of time, such as 5 minutes. Application of the organosilicon isocyanate to fabrics imparts water repellency thereto without tendering the fabric.

This invention is further illustrated by the following examples, in which the amounts are stated in parts by weight, unless otherwise specified.

Example I

A mixture comprising 50 parts of dimethylsilicon dichloride and 25 parts of methylsilicon trichloride is dissolved in 250 parts of anhydrous benzene. This solution is stirred and heated at reflux temperature while four 53-part portions of powdered lead cyanate are added at ½ hour intervals. The mixture is refluxed and stirred for an additional two hours, then cooled, filtered to separate lead salts, and subjected to distillation in a nitrogen atmosphere. After removal of the benzene there is obtained 20 parts of dimethylsilicon diisocyanate boiling at 72–75°/77 mm.

There is also obtained a small amount of methylsilicon triisocyanate.

The application of dimethylsilicon diisocyanate to undyed cotton sateen from solution in benzene or methyl ethyl ketone followed by drying and heat treatment for five minutes at 175° C. imparts a high degree of water repellency to the fabric. Essentially no tendering of the fabric results from this treatment.

Example II

Fifty-six and three-tenths parts of n-butylsilicon trichloride is dropped with agitation into 110 parts of benzene containing 125 parts of silver cyanate. After refluxing for 6 hours the silver salts are filtered out, the benzene distilled off, and the residue fractionally distilled at reduced pressure. A yield of 41 parts (70% of theory) of n-butylsilicon triisocyanate boiling at 115° C./23 mm. is obtained.

Example III

Forty-four parts of di-n-butylsilicon dichloride is reacted with 91.4 parts of silver cyanate in benzene by the procedure of the preceding example. After working up the reaction mixture in the manner of that example, there is obtained 35 parts (75% of theory) of di-n-butylsilicon diisocyanate boiling at 133° C./25 mm.

This invention is concerned with the new class of hydrocarbosilicon isocyanates having the general formula $R_nSi(NCO)_{4-n}$ in which $n$ is an integer having a value between 0 and 4, and R is a monovalent hydrocarbon radical, that is, a member selected from the class consisting of alkyl, alkenyl, aryl, aralkyl and cycloalkyl radicals. Specific examples of these types of radicals include methyl, ethyl, butyl, dodecyl, octadecyl, allyl, methallyl, undecylenyl, phenyl, tolyl, benzyl, phenylethyl, cyclohexyl, and dimethylcyclohexyl radicals.

The hydrocarbosilicon isocyanates of this invention are particularly useful in imparting water repellency to such substrates as textiles, especially cotton and rayon fabrics, to glass and to ceramics.

As many apparently widely different embodiments of this invention may be made without departing from the spirit and scope thereof, it is to be understood that the invention is not limited to the specific embodiments thereof except as defined in the appended claims.

I claim:
1. An alkylsilicon isocyanate.
2. A dialkylsilicon diisocyanate.
3. A butylsilicon isocyanate.
4. An article treated with an alkylsilicon isocyanate, characterized by possessing water-repellent properties.
5. An article treated with a dialkylsilicon diisocyanate, characterized by possessing water-repellent properties.
6. A water-repellent fabric in which water-repellency has been imparted by treatment of said fabric with an alkylsilicon isocyanate.
7. A water-repellent fabric in which water-repellency has been imparted by treatment of said fabric with a dialkylsilicon diisocyanate.
8. A hydrocarbosilicon isocyanate having the general formula $R_nSi(NCO)_{4-n}$ wherein $n$ is an integer having a value from 1 to 3, and R is a monovalent hydrocarbon radical selected from the class consisting of alkyl, alkenyl, aryl, aralkyl and cycloalkyl radicals.
9. The chemical compound, n-butylsilicon triisocyanate.
10. The chemical compound, di-n-butylsilicon diisocyanate.
11. An article treated with a hydrocarbosilicon isocyanate having the general formula

$$R_nSi(NCO)_{4-n}$$

wherein $n$ is an integer having a value from 1 to 3, and R is a monovalent hydrocarbon radical selected from the class consisting of alkyl, alkenyl, aryl, aralkyl and cycloalkyl radicals, said article being characterized by possessing water-repellent properties.
12. A water-repellent fabric in which water-repellency has been imparted by treatment of said fabric with a hydrocarbosilicon isocyanate having the general formula $R_nSi(NCO)_{4-n}$ wherein $n$ is an integer having a value from 1 to 3, and R is a monovalent hydrocarbon radical selected from the class consisting of alkyl, alkenyl, aryl, aralkyl and cycloalkyl radicals.
13. A composition of matter for imparting water-repellency to articles comprising a solvent and in solution therein a hydrocarbosilicon isocyanate having the general formula $$R_nSi(NCO)_{4-n}$$

wherein $n$ is an integer having a value from 1 to 3, and R is a monovalent hydrocarbon radical selected from the class consisting of alkyl, alkenyl, aryl, aralkyl and cycloalkyl radicals.
14. Chemical compounds corresponding to the general formula $(CH_3)_nSi(NCO)_{4-n}$, where $n$ is a whole number equal to from 1 to 3.

DAVID X. KLEIN.

REFERENCES CITED

The following references are of record in the file of this patent:

UNITED STATES PATENTS

| Number | Name | Date |
|---|---|---|
| 2,225,661 | Schirm | Dec. 24, 1940 |
| 2,253,128 | Langkammerer | Aug. 19, 1941 |
| 2,306,222 | Patnode | Dec. 22, 1942 |
| 2,405,988 | Barry | Aug. 20, 1946 |

OTHER REFERENCES

Forbes et al.: "Jour. Am. Chem. Soc.," vol. 62 (1940), pages 761–763.

Volnov: "Jour. Gen. Chem.," vol. 10 (1940), pages 1600–1604.

Forbes et al.: "Jour. Am. Chem. Soc.," vol. 70 (1948), pages 1043–1044.